United States Patent [19]

Shima et al.

[11] 4,148,775

[45] Apr. 10, 1979

[54] HOT-MELT ADHESIVE COMPOSITIONS

[75] Inventors: Keizo Shima, Suita; Yuichi Harada; Yoshinobu Ohya, both of Amagasaki, all of Japan

[73] Assignee: Daicel Ltd., Sakai, Japan

[21] Appl. No.: 897,186

[22] Filed: Apr. 17, 1978

[30] Foreign Application Priority Data

Apr. 18, 1977 [JP] Japan ................................. 52-44928

[51] Int. Cl.$^2$ ........................ C08K 5/36; C08L 77/00
[52] U.S. Cl. ............................ 260/30.8 R; 260/29.8; 260/829; 260/857 R
[58] Field of Search ................... 260/857 R, 829, 29.8, 260/30.8 R

[56] References Cited

U.S. PATENT DOCUMENTS

| | | | |
|---|---|---|---|
| 3,437,622 | 4/1969 | Dahl | 260/29.8 |
| 3,642,686 | 2/1972 | Zwahlen | 260/857 R |

OTHER PUBLICATIONS

Chemical Abstracts, Uchigaki, Taku, et al., Japan Kokai 75 63,028, vol. 83 (1975) Abstract No. 180344K.

*Primary Examiner*—Paul Lieberman
*Attorney, Agent, or Firm*—Hubbell, Cohen, Stiefel & Gross

[57] ABSTRACT

A novel hot-melt adhesive composition comprising 100 parts by weight of a polyamide copolymer resin having a melting point of about 80° to about 160° C. and composed of at least three monomers, about 5 to about 30 parts by weight of a terpene-phenol resin having a softening point of about 80° to about 120° C., and about 5 to about 10 parts by weight of a plasticizer.

9 Claims, 2 Drawing Figures

HOT-MELT ADHESIVE COMPOSITIONS

BACKGROUND OF THE INVENTION

1. Field of the Invention

This invention relates to novel hot-melt adhesive compositions. The invention provides thermoplastic hot-melt adhesive compositions which are capable of adhering articles at low temperatures (about 100° to about 130° C.) and imparting high bond strength to honeycombs by fully penetrating thereinto or forming fillets thereon. The present compositions also give high bond strength to metal or plywood materials and have outstanding resistance to water, moisture and heat (at about 80° to about 90°C.).

2. Description of the Prior Art

Hot-melt adhesives are useful to various articles including those of honeycomb structure which have found wide application, typically for use as doors, panels, partitions, etc.

These articles are prepared generally by spraying a rubber or epoxy resin adhesive of the solvent type to the opposite sides of a honeycomb core material and to one surface of each of opposite metal or plywood facings, holding the resulting sandwich assembly between hot pressing means for a given period of time for thermal activation of the adhesive and allowing the assembly to stand under predetermined pressure at room temperature for one day.

The method described is therefore inefficient and involves problems in that the solvent used produces adverse effects on the environment as well as on the human body. To overcome these problems, it has been proposed to use hot-melt adhesives of the solvent-free type, especially film-shaped adhesives which assure the highest production efficiency. Hot-melt adhesive films must fulfil the following requirements.

(1) For use in laminates of honeycomb structure faced for example with coated metal sheets, the adhesive must have good adhering properties at low temperatures, since the facing sheets need to be adhered to the honeycomb usually at 100° to 130° C. to avoid the thermal degradation of the coating.

(2) The adhesive must be capable of fully penetrating into the honeycomb or forming fillets thereon to provide a strong bond between the honeycomb and a metal or plywood facing.

(3) Despite the good adhering properties required at low temperatures, the adhesive must give satisfactory heat resistance to the resulting product which is likely to be heated to about 80° to about 90° C. as when exposed directly to the sunlight.

The known plastic hot-melt adhesive films nevertheless still fail to meet these requirements.

SUMMARY OF THE INVENTION

The present invention provides a hot-melt adhesive composition comprising 100 parts by weight of a polyamide copolymer resin having a melting point of about 80° to about 160° C. and composed of at least three monomers, about 5 to about 30 parts by weight of a terpene-phenol resin having a softening point of about 80° to about 120° C., and about 5 to about 10 parts by weight of a plasticizer.

DESCRIPTION OF THE PREFERRED EMBODIMENTS

Figure 1:
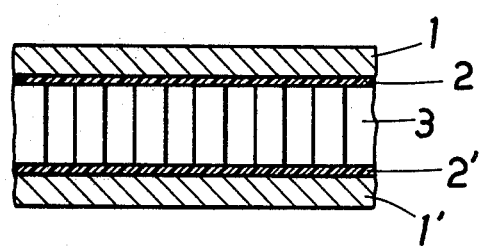
FIG. 1 is a diagram showing a laminate of honeycomb structure.

Useful polyamide copolymer resins having a melting point of about 80° to about 160° C. and prepared from at least three monomers are disclosed, for example, in Japanese Patent Application Disclosures No. 22240/1970, No. 16599/1972, No. 35290/1975, No. 35291/1975, No. 22034/1975, etc. Stated more specifically, examples of such resins are those prepard selectively from ε-caprolactum, lauryllactum, ω-aminoundecanoic acid, nylon 6,6 salt, nylon 6,9 salt, nylon 6, 10 salt, nylon 6, 12 salt, etc. The term "at least three monomers" herein used usually means three, four or five monomers. Preferable polyamide copolymer resins are those prepared from three or four monomers. Examples of such preferably resins are nylon 6/6,6/12, nylon 6/6,10/12, nylon 6/6,12/12, 6/6,9/12 nylon 6/6,6/6,10,12, 6/6,6/11/12, etc.

We have found that such polyamide copolymer resins give good results when having a melting point of about 100° to about 130° C. The use of resins having a melting point of not higher than about 80° C. results in poor heat resistance, whereas if resins with a melting point of not lower than about 160° C. are used, reduced adhering properties will result at low temperatures, since the composition will not exhibit adhereing properties unless heated to a considerably higher temperature.

In order to effectively permit the adhesive composition to penetrate into honycomb structures or to form fillets thereon and to render the composition resistant to water or moisture, about 5 to about 30 parts by weight, preferably about 10 to about 25 parts by weight, of a terpene-phenol resin is admixed with 100 parts by weight of the polyamide copolymer resin, the terpene-phenol resin having a softening point of about 80° to about 120° C. as measured by the ring and ball method. (The resins having a softening point in this range is about 500 to about 1,000 in molecular weight.) Terpene-phenol resins, prepared usually from refined pine oils, are α-pinene-phenol copolymer resins and are useful as tackifiers. Examples of other tackifiers are natural resins such as rosin and ester gum, and synthetic resins such as petroleum resin, cumarone resin and alkyd resin. Among these tackifiers, terpene-phenol resins are highly compatible with the polyamide copolymer resins and render the resulting composition highly amenable to extrusion, giving films of most satisfactory properties. Stated more specifically terpene-phenol resins having a softening point of about 80° to about 120° C. (ring and ball method) are preferable to use. With use of resins having a lower softening point (namely a reduced molecular weight), the laminates prepared with the resuling adhesive composition will have poor heat resistance, while the composition wil not be smoothly shapable to a film, and the film obtained will have a high blocking property. Conversely compositions incorporating a resin of higher softening point (i.e. higher molecular weight) fail to effectively penetrate into honeycombs or like workpieces or form fillets thereon then used at low temperatures. To ensure good results, the terpenephenol resin should be used in an amount of about 5 to 30 parts by weight, preferably about 10 to about 25 parts by weight, per 100 parts by weight of the polyamide copolymer resin. The terpene-phenol resin will be ineffective when used in a lesser amount, or will give greatly reduced mechanical strength to the composition if used in a greater amount.

The mixture of the polyamide copolymer resin and the terpene-phenol resin, although having high tackiness, possesses a small breaking elongation, low flexibility and poor workability. To remedy such drawbacks, the present compositions further incorporate a plasticizer and are thereby made more amenable to varying application conditions. While any of various plasticizers generally used for polyamide resins is useful, satisfactory plasticizing effects are achievable, for example, with use of benzenebutylsulfonamide, p-toluenesulfonamide, etc. The plasticizer is used in an amount of about 5 to about 10 parts by weight per 100 parts by weight of the polyamide copolymer resin. With less than about 5 parts by weight of the plasticizer present, a reduced plasticizing effect will result, whereas use of more than about 10 parts by weight of the plasticizer will adversely affect the adhering properties of the composition.

The hot-melt adhesive compositions of this invention are capable of adhering articles at low temperatures (about 100 to about 130° C.) and satisfactorily penetrating into workpieces or forming fillets thereon, and are highly adhesive to metal, plywood and various other materials and resistant to water, moisture and heat (about 80° to about 90° C.). Accordingly the present compositions are especially well suited to the adhesion of honeycombs. The compositions are also useful for adhering an automotive interior facing material (such as a laminate of a polyurethane foam shock absorbing material and a polyvinyl chloride sheet adhered thereto) to a base material (such as glass fibers) in which case the joint is in the form of a linear bond. The present compositions, which exhibit outstanding adhering properties at low temperatures, are advantageously usable also for the manufacture of cooling apparatus including coated steel panels since the coating is prone to degradation when subjected to high temperatures.

This invention will be described below with reference to examples.

EXAMPLE 1

Hot-melt adhesive compositions were prepared from a polyamide copolymer resin having a melting point of 150° C. and composed of three monomers (prepared from nylon 6/6,12/12 in the weight ratio of 30:30:40), p-toluenesulfonamide serving as a plasticizer and a tackifier in the proportions listed in Table 1 below. The tackifiers used were as follows:

Terpene-phenol resin (α-pinene-phenol copolymer resins prepared from refined pine oils):
YS polyster T100 (product of Yasuhara Yushi Kogyo Co., Ltd., Japan; softening point: 100° C.)
YS Polyster T115 (product of the same; softening point: 115° C.)
YS Polyster T130 (product of the same; softening point: 130° C.)
Petroleum resin:
Arkon P100 (Product of Arakawa Rinsan Kagaku Kogyo Co., Ltd., Japan; softening point: 100° C.)
Terpene-base polymer resin:
YS Resin Px No. 900 (product of Yasuhara Yushi Kogyo Co., Ltd., Japan; softening point: 92° C.)

To prepare a homogeneous composition, the components were pulverized, fully kneaded together in a mixer and made into pellets with an extruder, 40 mm in diameter. The pellets were then shaped into a 50-micron-thick film with an extruder 65 mm in diameter and equipped with a T-die of 1,000 mm in width. Each composition was checked for shapability according to the criteria given below. Table 1 shows the results.

A: Composition which was extrudable free of any surging or fisheyes, giving a film with no blocking property.
B: Composition which was extruded with some surging, with difficulty encountered in forming a film of uniform thickness.
C: Composition in which the components had poor compatibility, entirely failing to steadily form a film.

The metling point of the polyamide copolymer resin was measured with a differential scanning calorimeter by heating the resin at a rate of 10° C./min and measuring the temperature at which maximum heat absorption took place. The softening point of the tackifier was measured according to the ring and ball method.

Table 1

| Film No. | Polyamide copolymer resin (wt. part) | Plasticizer (wt. part) | Tackifier (wt. part) | | Shapability |
|---|---|---|---|---|---|
| 1  | 100 | 0  | 0           | 0  | A |
| 2  | "   | 3  | 0           | 0  | A |
| 3  | "   | 5  | 0           | 0  | A |
| 4  | "   | 7  | 0           | 0  | A |
| 5  | "   | 10 | 0           | 0  | A |
| 6  | "   | 14 | 0           | 0  | A |
| 7  | "   | 0  | YS Polyster | T100 20 | A |
| 8  | "   | 0  | "           | T115 20 | A |
| 9  | "   | 0  | "           | T130 20 | A |
| 10 | "   | 3  | "           | T100 3  | A |
| 11 | "   | "  | "           | " 5     | A |
| 12 | "   | "  | "           | " 10    | A |
| 13 | "   | "  | "           | " 20    | A |
| 14 | "   | "  | "           | " 30    | A |
| 15 | "   | "  | "           | " 40    | B |
| 16 | "   | 5  | "           | " 3     | A |
| 17 | "   | "  | "           | " 5     | A |
| 18 | "   | "  | "           | " 10    | A |
| 19 | "   | "  | "           | " 20    | A |
| 20 | "   | "  | "           | " 30    | A |
| 21 | "   | "  | "           | " 40    | B |
| 22 | 100 | 7  | YS Polyster | T100 3  | A |
| 23 | "   | "  | "           | " 5     | A |
| 24 | "   | "  | "           | " 10    | A |
| 25 | "   | "  | "           | " 20    | A |
| 26 | "   | "  | "           | " 30    | A |
| 27 | "   | "  | "           | " 40    | B |
| 28 | "   | 10 | "           | " 3     | A |
| 29 | "   | "  | "           | " 5     | A |
| 30 | "   | "  | "           | " 10    | A |
| 31 | "   | "  | "           | " 20    | A |
| 32 | "   | "  | "           | " 30    | A |
| 33 | "   | "  | "           | " 40    | B |
| 34 | "   | 14 | "           | " 3     | A |
| 35 | "   | "  | "           | " 5     | A |
| 36 | "   | "  | "           | " 20    | B |
| 37 | "   | "  | "           | " 40    | C |
| 38 | "   | 3  | YS Polyster | T115 5  | A |
| 39 | "   | "  | "           | " 20    | A |
| 40 | "   | "  | "           | " 40    | B |
| 41 | "   | 7  | "           | " 5     | A |
| 42 | "   | "  | "           | " 20    | A |
| 43 | "   | "  | "           | " 40    | B |
| 44 | 100 | 10 | YS Polyster | T115 5  | A |
| 45 | "   | "  | "           | " 20    | A |
| 46 | "   | "  | "           | " 40    | B |
| 47 | "   | 14 | "           | " 5     | A |
| 48 | "   | "  | "           | " 20    | B |
| 49 | "   | "  | "           | " 40    | C |

Table 1-continued

| Film No. | Polyamide copolymer resin (wt. part) | Plasticizer (wt. part) | Tackifier (wt. part) | | Shapability |
|---|---|---|---|---|---|
| 50 | " | 7 | " | T130 | 10 | A |
| 51 | " | " | " | " | 20 | A |
| 52 | " | " | " | " | 30 | B |
| 53 | " | " | Arkon P 100 | | 10 | A |
| 54 | " | " | " | | 20 | C |
| 55 | " | " | " | | 30 | C |
| 56 | " | " | YS Resin Px #900 | | 10 | A |
| 57 | " | " | " | | 20 | C |
| 58 | " | " | " | | 30 | C |

EXAMPLE 2

Each of the 50-micron-thick adhesive films obtained in Example 1 was used to prepare a laminate specimen from a 27-mm-thick paper honeycomb (feather core) and 0.5-mm-thick mild steel panels thoroughly cleaned with trichlene and dried.

Figure 2:
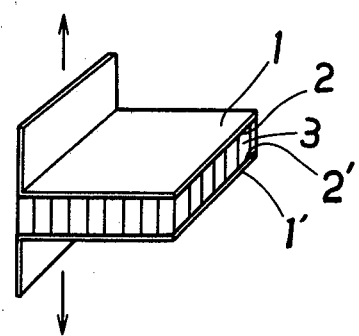
FIG. 2 is a diagram showing a honeycomb specimen for breaking test.

First, a superposed assembly, 300 mm × 300 mm, was prepared which was composed of a mild steel plate 1, adhesive film 2, honeycomb 3, adhesive film 2' and mild steel panel 1' as seen in FIG. 1. The assembly was then held between hot pressing means at a surface temperature of 120° C. under pressure of 1.5 kg/cm² for 5 minutes. The specimen thus obtained was cut so as to have a lap joint area of 100 mm × 100 mm as seen in FIG. 2, and the test piece was tested for breaking strength on a tensile testing machine at a speed of 50 mm/min. The specimen was also tested for resistance to heat, moisture and cold and thermal schock by the following methods. The results are listed in Table 2.

(1) Heat resistance

The specimen was allowed to stand in an oven at 80°±1° C. for one week and thereafter tested for breaking strength.

(2) Moisture resistance

The specimen was allowed to stand in a constant-temperature chamber at 40° C. and 90% RH for one week and thereafter tested for breaking strength.

(3) Cold resistance

The specimen was allowed to stand in a freezer at −25°±3° C. for one week and thereafter tested for breaking strength.

(4) Thermal shock test

The specimen was allowed to stand first in an oven at 80°±1° C. for 4 hours and then in a freezer at −25°±3° C. for 4 hours. This procedure was repeated 5 times in succession, and the specimen was thereafter tested for breaking strength.

Table 2

| Film No. | Breaking strength (kg/100 mm × 100 mm) | | | | |
|---|---|---|---|---|---|
| | Blank | Heat resistance | Moisture resistance | Cold resistance | Thermal shock test |
| 1 | 5.0 | 3.2 | 3.6 | 4.4 | 2.8 |
| 2 | 5.1 | 3.0 | 2.9 | 4.2 | 2.4 |
| 3 | 5.3 | 3.3 | 2.7 | 4.1 | 2.1 |
| 4 | 6.0 | 3.6 | 3.0 | 4.7 | 2.0 |
| 5 | 6.0 | 3.4 | 2.9 | 4.0 | 2.0 |
| 6 | 5.4 | 3.0 | 2.2 | 3.9 | 1.6 |
| 7 | 6.6 | 4.7 | 4.9 | 5.0 | 4.6 |
| 8 | 7.0 | 4.7 | 4.6 | 5.0 | 4.8 |
| 9 | 5.5 | 3.0 | 3.5 | 4.2 | 3.3 |
| 10 | 5.2 | 3.5 | 3.0 | 4.0 | 3.0 |
| 11 | 5.3 | 3.7 | 3.1 | 4.0 | 3.1 |
| 12 | 5.3 | 3.6 | 3.0 | 3.9 | 3.2 |
| 13 | 7.0 | 4.9 | 5.0 | 5.6 | 5.0 |
| 14 | 5.7 | 4.0 | 4.2 | 5.0 | 4.0 |
| 15 | 4.9 | 3.9 | 4.0 | 4.2 | 3.6 |
| 16 | 5.7 | 4.1 | 4.2 | 4.6 | 4.0 |
| 17 | 6.9 | 5.0 | 5.1 | 5.6 | 5.0 |
| 18 | 7.9 | 6.0 | 6.4 | 6.8 | 6.0 |
| 19 | 9.9 | 8.5 | 8.1 | 9.0 | 8.2 |
| 20 | 6.0 | 5.1 | 5.3 | 5.4 | 5.0 |
| 21 | 4.9 | 3.6 | 3.8 | 3.9 | 3.4 |
| 22 | 6.0 | 4.2 | 4.0 | 4.6 | 4.0 |
| 23 | 9.6 | 8.0 | 7.5 | 8.4 | 7.8 |
| 24 | 12.5 | 9.7 | 8.5 | 11.5 | 9.0 |
| 25 | 14.0 | 12.5 | 13.2 | 14.1 | 11.7 |
| 26 | 10.5 | 8.4 | 9.3 | 9.4 | 9.0 |
| 27 | 6.1 | 4.9 | 4.7 | 4.9 | 4.1 |
| 28 | 6.2 | 4.4 | 4.1 | 4.6 | 4.0 |
| 29 | 9.8 | 7.0 | 7.0 | 8.0 | 6.9 |
| 30 | 12.2 | 11.0 | 10.5 | 11.4 | 10.3 |
| 31 | 13.7 | 11.6 | 10.7 | 11.9 | 10.0 |
| 32 | 10.2 | 8.2 | 9.0 | 9.1 | 8.0 |
| 33 | 5.8 | 4.0 | 4.1 | 4.3 | 3.4 |
| 34 | 4.6 | 3.1 | 2.9 | 3.3 | 1.9 |
| 35 | 4.4 | 2.2 | 3.0 | 3.5 | 2.0 |
| 36 | 3.7 | 2.4 | 2.0 | 3.0 | 2.4 |
| 37 | — | — | — | — | — |
| 38 | 5.0 | 3.4 | 3.0 | 4.0 | 2.9 |
| 39 | 5.5 | 2.0 | 4.2 | 3.9 | 2.1 |
| 40 | 4.8 | 3.2 | 3.1 | 3.5 | 1.9 |
| 41 | 9.0 | 7.8 | 7.0 | 6.9 | 7.2 |
| 42 | 13.3 | 11.9 | 12.0 | 11.8 | 10.7 |
| 43 | 5.9 | 4.0 | 4.2 | 4.0 | 3.7 |
| 44 | 8.7 | 6.9 | 7.0 | 7.9 | 6.6 |
| 45 | 12.2 | 11.0 | 10.0 | 11.4 | 9.0 |
| 46 | 5.0 | 3.3 | 3.2 | 3.6 | 2.9 |
| 47 | 5.1 | 3.0 | 2.9 | 3.3 | 2.1 |
| 48 | 3.2 | 2.7 | 1.9 | 3.0 | 2.0 |
| 49 | — | — | — | — | — |
| 50 | 5.5 | 2.2 | 3.5 | 3.7 | 1.9 |
| 51 | 5.5 | 2.0 | 4.2 | 3.9 | 2.1 |
| 52 | 4.8 | 3.0 | 3.9 | 3.9 | 2.1 |
| 53 | 5.1 | 3.3 | 3.6 | 3.0 | 1.7 |
| 54 | — | — | — | — | — |
| 55 | — | — | — | — | — |
| 56 | 4.9 | 3.0 | 2.9 | 3.4 | 2.0 |
| 57 | — | — | — | — | — |
| 58 | — | — | — | — | — |

Table 1 showing the shapability of the compositions to a film reveals that in the case of Films Nos. 54, 55, 57 and 58, the compsitions in which 20 parts by weight or more of the petroleum resin or terpene-base polymer resin is used per 100 parts by weight of the polyamide copolymer resin involve poor compatibility and are therefore unable to form a film. Further the results achieved with Film Nos. 15, 21, 27, 33, 37, 40, 43, 46 and 49 reveal that even the terpene-phenol resin of this invention fails to ensure stable shapability if used in excess of 30 parts by weight per 100 parts by weight of the polyamide resin.

With reference to Table 2 showing the bond strength (blank), resistance to heat, moisture and cold, and thermal shock in terms of breaking strength, Film Nos. 17 to 20, 23 to 26, 29 to 32, 41, 42, 44 and 45 represent specimens of this invention, the other films being reference specimens. It is seen that the film (No. 1) composed singly of the polyamide copolymer resin and films (Nos. 2 to 6) containing 3 to 14 parts by weight of the plasticizer only per 100 parts by weight of the polyamide copolymer resin do not have effective bond strength, whereas the adhesive films according to this invention have outstanding bond strength. This indicates that the use of the terpene-phenol resin permits the composition to penetrate into the honeycomb and to form fillets thereon, thereby giving enhanced bond strength. The results attained by Films Nos. 34 to 37 and 47 to 49 indicate that use of 14 parts by weight of the plasticizer affords no improvement in the bond strength but rather leads to reduced strength dispite the conjoint use of 5 to 20 parts by weight of the terpene-phenol resin. In the case of Films Nos. 53 and 56, it is seen that the use of the plasticizer (7 parts by weight) in combination with the petroleum resin or terpene-base resin fails to achieve any improvement in bond strength.

What we claim is:

1. A hot-melt adhesive composition comprising 100 parts by weight of a polyamide copolymer resin having a melting point of about 80° to about 160° C. and composed of at least three monomers, about 5 to about 30 parts by weight of a terpene-phenol resin having a softening point of about 80° to 120° C., and about 5 to about 10 parts by weight of a plasticizer.

2. A composition as defined in claim 1 wherein the polyamide copolymer resin has a melting point of about 100° to about 130° C.

3. A composition as defined in claim 1 wherein the polyamide copolymer resin is a resin prepared selectively from $\epsilon$-caprolactum, lauryllactum, $\omega$-amonoundecanoic acid, nylon 6,6 salt, nylon 6,9 salt, nylon 6,10 salt and nylon 6,12 salt.

4. A composition as defined in claim 1 which comprises about 10 to about 25 parts by weight of the terpene-phenol resin.

5. A composition as defined in claim 1 wherein the terpene-phenol resin has a softening point of about 100° to about 115° C.

6. A composition as defined in claim 1 wherein the plasticizer is p-toluensulfonamide or benzenebutylsulfonamide.

7. A composition as defined in claim 1 which is in the form of film.

8. A composition as defined in claim 1 wherein the terpene-phenol resin is an $\alpha$-pinene-phenol copolymer resin.

9. A honeycomb having the adhesive as defined in claim 1 adhered thereto.

* * * * *